United States Patent
Muneta et al.

(10) Patent No.: US 7,472,106 B2
(45) Date of Patent: Dec. 30, 2008

(54) SAFETY NETWORK SYSTEM AND SAFETY SLAVE

(75) Inventors: Yasuo Muneta, Kyoto (JP); Toshiyuki Nakamura, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 191 days.

(21) Appl. No.: 10/481,503

(22) PCT Filed: Jun. 21, 2002

(86) PCT No.: PCT/JP02/06242

§ 371 (c)(1),
(2), (4) Date: Jun. 7, 2004

(87) PCT Pub. No.: WO03/001749

PCT Pub. Date: Jan. 3, 2003

(65) Prior Publication Data
US 2004/0210620 A1 Oct. 21, 2004

(30) Foreign Application Priority Data
Jun. 22, 2001 (JP) ............................. 2001-190418

(51) Int. Cl.
*G06F 7/00* (2006.01)
(52) U.S. Cl. ..................................... 707/2; 707/104.1
(58) Field of Classification Search .......... 707/1–104.1; 399/8–9
See application file for complete search history.

(56) References Cited

U.S. PATENT DOCUMENTS

| | | | |
|---|---|---|---|
| 3,803,974 A | 4/1974 | Evere et al. | |
| 4,625,308 A | 11/1986 | Kim et al. | |
| 4,715,031 A | 12/1987 | Crawford et al. | |
| 4,750,171 A | 6/1988 | Kedar et al. | |
| 5,059,953 A * | 10/1991 | Parsons et al. | 340/578 |
| 5,130,716 A * | 7/1992 | Kleiber | 342/173 |
| 5,157,780 A * | 10/1992 | Stewart et al. | 714/31 |
| 5,206,835 A * | 4/1993 | Beauducel | 367/21 |
| 5,218,680 A | 6/1993 | Farrell et al. | |
| 5,282,127 A * | 1/1994 | Mii | 700/1 |

(Continued)

FOREIGN PATENT DOCUMENTS

EP 0905594 A1 3/1999

(Continued)

OTHER PUBLICATIONS

European File History, Application No. 02730857.6—2206, Patent No. 1396772, Date of Filing May 31, 2002.

*Primary Examiner*—Don Wong
*Assistant Examiner*—Linh Black
(74) *Attorney, Agent, or Firm*—Foley & Lardner LLP

(57) ABSTRACT

A safety PLC 1 serving as a master and a safety slave 2 are connected through a safety network 3 to constitute a network system. The safety slave has non-safety information storing unit 26 for storing individual information and a state information of the connected safety device, the state information monitors a state of the operating safety device and a stored content is updated based on its monitored result. Then, when the non-safety information satisfying a fixed condition, at least the non-safety information satisfied the condition is transmitted to the safety PLC. That processing is performed by an MPU 23. Thus, unnecessary non-safety information is not transmitted.

4 Claims, 12 Drawing Sheets

U.S. PATENT DOCUMENTS

| | | | |
|---|---|---|---|
| 5,389,920 A * | 2/1995 | DeLand et al. .......... 340/825.69 |
| 5,400,018 A | 3/1995 | Scholl et al. |
| 5,519,607 A * | 5/1996 | Tawil ............................ 705/2 |
| 5,572,195 A | 11/1996 | Heller et al. |
| 5,598,566 A * | 1/1997 | Pascucci et al. .............. 713/324 |
| 5,732,094 A | 3/1998 | Petersen et al. |
| 5,786,996 A * | 7/1998 | Vitkus et al. ................... 700/82 |
| 5,841,654 A | 11/1998 | Verissimo et al. |
| 5,850,338 A | 12/1998 | Fujishima |
| 5,907,689 A | 5/1999 | Tavallaei et al. |
| 5,933,675 A * | 8/1999 | Sawada et al. .................. 399/8 |
| 5,995,916 A | 11/1999 | Nixon et al. |
| 6,026,348 A | 2/2000 | Hala |
| H1882 H | 10/2000 | Asthana et al. |
| 6,154,726 A * | 11/2000 | Rensimer et al. ............... 705/2 |
| 6,347,252 B1 * | 2/2002 | Behr et al. ...................... 700/3 |
| 6,353,615 B1 * | 3/2002 | Bohne ........................ 370/442 |
| 6,353,867 B1 * | 3/2002 | Qureshi et al. .............. 710/305 |
| 6,389,480 B1 | 5/2002 | Kotzur et al. |
| 6,473,811 B1 | 10/2002 | Onsen |
| 6,477,335 B1 | 11/2002 | Surya et al. |
| 6,507,804 B1 | 1/2003 | Hala et al. |
| 6,532,508 B2 | 3/2003 | Heckel et al. |
| 6,571,128 B2 * | 5/2003 | Lebel et al. .................... 607/60 |
| 6,574,234 B1 | 6/2003 | Myer et al. |
| 6,577,918 B1 * | 6/2003 | Roth ......................... 700/177 |
| 6,640,268 B1 | 10/2003 | Kumar |
| 6,708,072 B2 | 3/2004 | Arima et al. |
| 6,762,684 B1 | 7/2004 | Camhi |
| 6,795,871 B2 * | 9/2004 | Nolan et al. ................... 710/8 |
| 6,832,343 B2 | 12/2004 | Rupp et al. |
| 7,152,188 B1 | 12/2006 | Meyer-Graefe et al. |
| 2001/0037267 A1 | 11/2001 | Sato et al. |
| 2002/0082060 A1 | 6/2002 | Kang et al. |
| 2002/0129033 A1 * | 9/2002 | Hoxie et al. ................ 707/101 |
| 2003/0009610 A1 * | 1/2003 | Nolan et al. ................... 710/72 |
| 2003/0037170 A1 | 2/2003 | Zeller et al. |
| 2003/0114288 A1 * | 6/2003 | Harding et al. ............. 493/464 |
| 2003/0148760 A1 | 8/2003 | Takayanagi |
| 2004/0018817 A1 | 1/2004 | Kanayama et al. |
| 2004/0125821 A1 | 7/2004 | Kuhl |
| 2004/0181296 A1 | 9/2004 | Muneta et al. |
| 2004/0210323 A1 | 10/2004 | Muneta et al. |
| 2004/0210326 A1 | 10/2004 | Muneta et al. |
| 2004/0210329 A1 | 10/2004 | Chen et al. |
| 2004/0210620 A1 | 10/2004 | Muneta et al. |
| 2004/0215354 A1 | 10/2004 | Nakamura et al. |
| 2005/0017875 A1 | 1/2005 | Nakayama et al. |

FOREIGN PATENT DOCUMENTS

| | | |
|---|---|---|
| GB | 2267984 A | 12/1993 |
| GB | 2307068 A | 5/1997 |
| GB | 2 347 234 | 8/2000 |
| JP | 60-062482 | 4/1985 |
| JP | 03-116395 A | 5/1991 |
| JP | 04-045697 A | 2/1992 |
| JP | 05-37980 A | 2/1993 |
| JP | 6-324719 A | 10/1995 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO-99/67690 | 12/1999 |
| WO | WO-00/68660 | 11/2000 |
| WO | WO 02/098065 A1 | 12/2002 |

* cited by examiner

Fig. 6

| | Kind of device | Manufacturer | Type | State | The number of operations | Life span setting | Energized time | |
|---|---|---|---|---|---|---|---|---|
| Input 1 | Door SW | A company | XXXXX | ON | 151 | 80000 | 2877h | ... |
| Input 2 | | | | | | | | |
| Input 3 | Limit SW | B company | YYYYY | ON | 50 | 80000 | 2897h | ... |
| Input 4 | Emergency stop SW | A company | ZZZZZ | ON | 2 | 50000 | 2899h | ... |
| ... | | | | | | | | |

| Energized time transmission | |
|---|---|
| 200h | Transmission |
| 400h | Transmission |
| 600h | Transmission |
| 800h | Transmission |

(b)

| The number of ON/OFF operations at relay | |
|---|---|
| 3000 times | Transmission |
| 5000 times | Transmission |
| 8000 times | Transmission |
| 10000 times | Transmission |

(c)

| Retrying operation information | |
|---|---|
| Communication cycle 500 times | Transmission |
| Communication cycle 1000 times | Transmission |
| Communication cycle 1500 times | Transmission |
| Communication cycle 2000 times | Transmission |

SAFETY NETWORK SYSTEM AND SAFETY SLAVE

This application is a National Stage application of PCT/JP02/06242, filed Jun. 21, 2002, which claims priority from Japanese patent application 2001-190418, filed Jun. 22, 2001. The entire contents of each of the aforementioned applications are incorporated herein by reference.

TECHNICAL FIELD

The present invention relates to a safety network system and a safety slave.

BACKGROUND ART

According to a programmable controller (referred to as a PLC hereinafter) used in a factory automation (referred to as an FA hereinafter), ON/OFF information is input from an input device such as a switch or a sensor, a logic operation is carried out along a sequence program (referred to as a user program also) written in ladder language or the like, and signal of the ON/OFF information is output to an output device such as a relay or a valve actuator, according to a result of the operation.

Meanwhile, the input device and the output device may be directly connected to the PLC, or may be connected thereto through a network. When a network system is constituted so as to be connected through the network, the ON/OFF information is transmitted or received through the network. At this time, the information is transmitted or received by a master/slave system normally, in which a master is on the PLC side and a slave is on the device side.

Meanwhile, a fail-safe (safety) system has been gradually introduced in the control of the PLC recently. In other words, like the PLC and the device itself, the network is constituted so as to incorporate a safety function. Here, the safety function is a function of confirming the safety and outputting it. Then, when the network system becomes in a danger state such as a case where an emergency stop switch is pressed down or a sensor such as a light curtain detects intrusion of a human (a part of a human body), the fail-safe works so that the system stops the operation on the safe side. In other words, the system generates an output to get a machine to work only when the safety is confirmed by the safety function. Therefore, when the safety is not confirmed, the machine is stopped.

In the case of the network system (safety network system) comprising the above safety function, it is necessary to keep the constant maximum response time taken from the time the abnormal and danger state is generated to the time the safety operation (stop of the apparatus or the like) is carried out. That is, as well known, when the information is transmitted by the master/slave system, each slave sequentially returns a safety response to a master according to a demand from the master as shown in FIG. 1(a). According to an example shown in FIG. 1, there are three slaves constituting the network system. The ON/OFF information used here is information for safety control such as normal (safety)/abnormal (danger). The maximum response a time is assured by time taken for one communication cycle.

Meanwhile, there is a demand for collecting complementary information (non-safety information) such as a state of the slave, an energized time and the number of operations, other than the safety information for monitoring the slave or the device connected to the slave, regularly or irregularly. When the above non-safety information is obtained, a life span of the device is determined and the device is exchanged before it is actually damaged and the system is stopped, for example.

However, as described above, when the non-safety information is transmitted, it is thought that all non-safety information is transmitted in a communication cycle 1 and all safety information is transmitted in the next communication cycle 2 in an example shown in FIG. 1(a), for example. However, according to this method, since the safety information cannot be transmitted for the communication cycle 1, the maximum response time becomes twice as long as the communication cycle in the result.

As another method, as shown in FIG. 1(b), information in which the non-safety information is added to the safety response for transmitting the safety information can be returned.

When the non-safety information is transmitted as described above, a traffic is influenced by that in both above methods, so that a communication performance of the safety information is also influenced. In other words, it should be understood that since the safety information cannot be transmitted while the non-safety information is transmitted, the transmission of the safety information is delayed for that.

Thus, since the safety slave returns the non-safety information after received the demand from the master (safety PLC), as the returning intervals are reduced, the further linear non-safety information can be monitored, but as the output intervals of the demand are shortened, an influence on the network traffic becomes large.

It is an object of the present invention to provide a safety network system and a safety slave which can effectively collect non-safety information while an influence on a network traffic is prevented as much as possible.

DISCLOSURE OF THE INVENTION

A safety slave according to the present invention is a safety slave which is connectable to a safety network. It is constituted so as to comprise a safety information transmitting function of transmitting safety information determining a safety state or not, corresponding to a demand transmitted from a safety controller through the safety network, non-safety information storing means for storing non-safety information about the safety slave, and a function of transmitting at least the non-safety information which satisfies a fixed condition to the safety controller when the non-safety information stored in the non-safety information storing means satisfies the fixed condition. Thus, transmission of the non-safety information can be performed in one communication cycle based on the demand after other safety slaves finish safety responses.

In addition, it is a safety slave connectable to a safety network and comprises a safety information transmitting function of transmitting safety information determining a safety state or not, corresponding to a demand transmitted from a safety controller through the safety network, non-safety information storing means for storing non-safety information about the safety slave, storing means for storing a condition for transmitting the non-safety information, monitoring means for determining whether the non-safety information stored in the non-safety information satisfies the condition or not, and determining means for determining a transmission timing based on a monitored result of the monitoring means.

Meanwhile, a safety network system according to the present invention comprises a safety controller and a safety slave according to claim 1 or 2, which are connected through a safety network, in which information of the device output from the slave is transmitted to the controller.

Then, one communication cycle managed by the safety controller preferably has a reception period for the non-safety information after reception of the safety response from the safety slave.

Here, the safety information includes information shows whether at least safety slave and safety device connected thereto is in a safety state or not. Of course, it may include information other than that. Meanwhile, the non-safety information is various kinds of information which does not include the safety information. For example, there are a life span of a relay, an investigated result, an energized time, the number of operations, type information and the like. Here, the "energized time" and "the number of operations" are measured and counted by a timer and a counter, respectively and their present values are transmitted as the non-safety information. Meanwhile, the "life span of the relay" means life span prediction. More specifically, the non-safety information of this life span of the relay is not the information to the effect that the safety operation cannot be performed because the life span is finished (this is included in the safety information), but the prognostic information to the effect that the safety operation is performed but a time for maintenance (exchange, adjustment and the like) comes close. The "investigated result" is the information of statistical prediction or detection. In other words, this is not the result of the self-diagnosis on the side of the slave. This self-diagnosis result is transmitted as the safety information. In addition, as examples of the detection result as the non-safety information, there are information such that the safety operation is performed, but ① the life span is coming, ② it is used in a bad environment, ③ a temperature, ④ an oscillation state, ⑤ a supply voltage, ⑥ an overuse state and the like. The maintenance (exchange, adjustment and the like) can be performed ahead of time by obtaining the above information, so that it is prevented that the device is stopped because the life span is finished and an influence due to the malfunction becomes large. Furthermore, the result of the self-diagnosis becomes one kind of the non-safety information.

In addition, the "safety function" is so called a fail-safe function which is a system generating an output only when it is safe to get a machine to work. Therefore, when it becomes unsafe, the output is stopped. Thus, when the malfunction is generated in the control of the controller or the like, or when communication malfunction is generated, the control is stopped, and the output device and the control device can maintain safety states because the controller is stopped.

As examples when the control stop is necessary, there are a case where a CPU of the controller and other processing portion or the like are doubled and inconsistency between both is detected, a case where the malfunction is generated in the network for same reason, a case where an emergency stop switch in a mechanical system is pressed down, and a case where intrusion of a human (a part of a body) in a danger region is detected by a multi-axis photoelectric sensor and a danger state is generated. Thus, in the above cases, the mechanical system to be controlled is surely operated in the safety state by the safety function, or it is stopped in the safety state in addition to the operation, or the mechanical system can be forced to stop the operation in the safety state by the fail-safe function.

In addition, the safety device is connected to the safety slave in some cases, or the safety device itself can be the safety slave and transmit and receive data with the safety controller. As a concrete example in which the safety device itself can be the safety slave, there is a light curtain (multi-axis photoelectric sensor). More specifically, the function of detecting that the human enters the danger region is included in the safety device (input device) and the function of transmitting a signal of a detection result to the master through the network is included in the safety slave.

Furthermore, the non-safety information about the safety slave may include the non-safety information of the safety device connected to the safety slave or it may be only the non-safety information of the safety device.

According to the present invention, it is determined whether the transmission timing for the non-safety information has come or not on the side of the safety slave which collected and stored the non-safety information, and when the transmission timing is reached, the non-safety information is transmitted to the safety controller. In other words, although the non-safety information is not necessarily transmitted frequently, when a certain set value is reached, there is a demand for obtaining it for the maintenance or prediction of the life span. Then, only the safety slave which actually collected the non-safety information knows whether the set value is reached or not.

Therefore, since the determination whether the non-safety information is transmitted or not which was made on the side of the safety controller conventionally is placed under the control of the safety slave, the non-safety information can be transmitted at the appropriate timing. For the side of the safety controller, the received non-safety information is all meaningful and the information can be effectively collected.

In other words, when the non-safety information is transmitted based on the demand from the safety controller, unnecessary or meaningless non-safety information could be transmitted, which could badly affect on the traffic. According to the present invention, however, since the information is transmitted when the predetermined necessary transmission timing was reached, the influence on the network traffic can be reduced as much as possible.

Still further, according to the present invention, although it is necessary secure a time for transmitting the non-safety information each communication cycle, when the transmission timing is not reached frequently in a normal state, it is enough that the time for transmitting the non-safety information is set in one communication cycle so that the information may be transmitted from one or a few safety slaves, for example. Thus, the communication is shortened in total. Moreover, even when the transmission time only for one safety slave is provided and there are plurality of safety slaves reaching the transmission timing once, since it is not so urgent in the case of the non-safety information, it is all right that the non-safety information which could not be transmitted from the safety slave in the present cycle may be transmitted in the next or later communication cycle.

In addition, although the safety slave transmits the safety information and the non-safety information according to the demand from the safety controller in the above present invention, the present invention is not limited to this, and the transmission destination is optional.

More specifically, it is a safety slave connectable to a safety network and it comprises a safety information transmitting function of transmitting safety information determining a safety state or not, corresponding to a demand transmitted from another node through the safety network, non-safety information storing means for storing non-safety information about the safety slave, and a function of transmitting at least the non-safety information which satisfies a fixed condition to the other node when the non-safety information stored in the non-safety information storing means satisfies the condition.

Here, the other node is a node connected to the safety network, such as a configuration tool, a monitor or another slave.

In addition, although the safety information and the non-safety information are transmitted based on the external trigger such as the demand from the transmission destination in the above each embodiment, the present invention is not limited to this, and the safety information and the non-safety information can be voluntarily transmitted based on an internal trigger.

More specifically, it is a safety slave connectable to a safety network and it comprises a safety information transmitting function of transmitting safety information determining a safety state or not, when a transmission condition is satisfied, non-safety information storing means for storing non-safety information about the safety slave; and a function of transmitting at least the non-safety information which satisfies a fixed condition to the other node connected to the safety network when the non-safety information stored in the non-safety information storing means satisfies the condition.

BRIEF DESCRIPTION OF THE DRAWINGS

FIG. 6 shows a view of a data structure of a non-safety information storing unit.

FIG. 8 shows a view of a data structure of a non-safety information transmission controlling unit.

BEST MODE FOR CARRYING OUT THE INVENTION

The present invention is described in detail with reference to the accompanying drawings.

Figure 1:
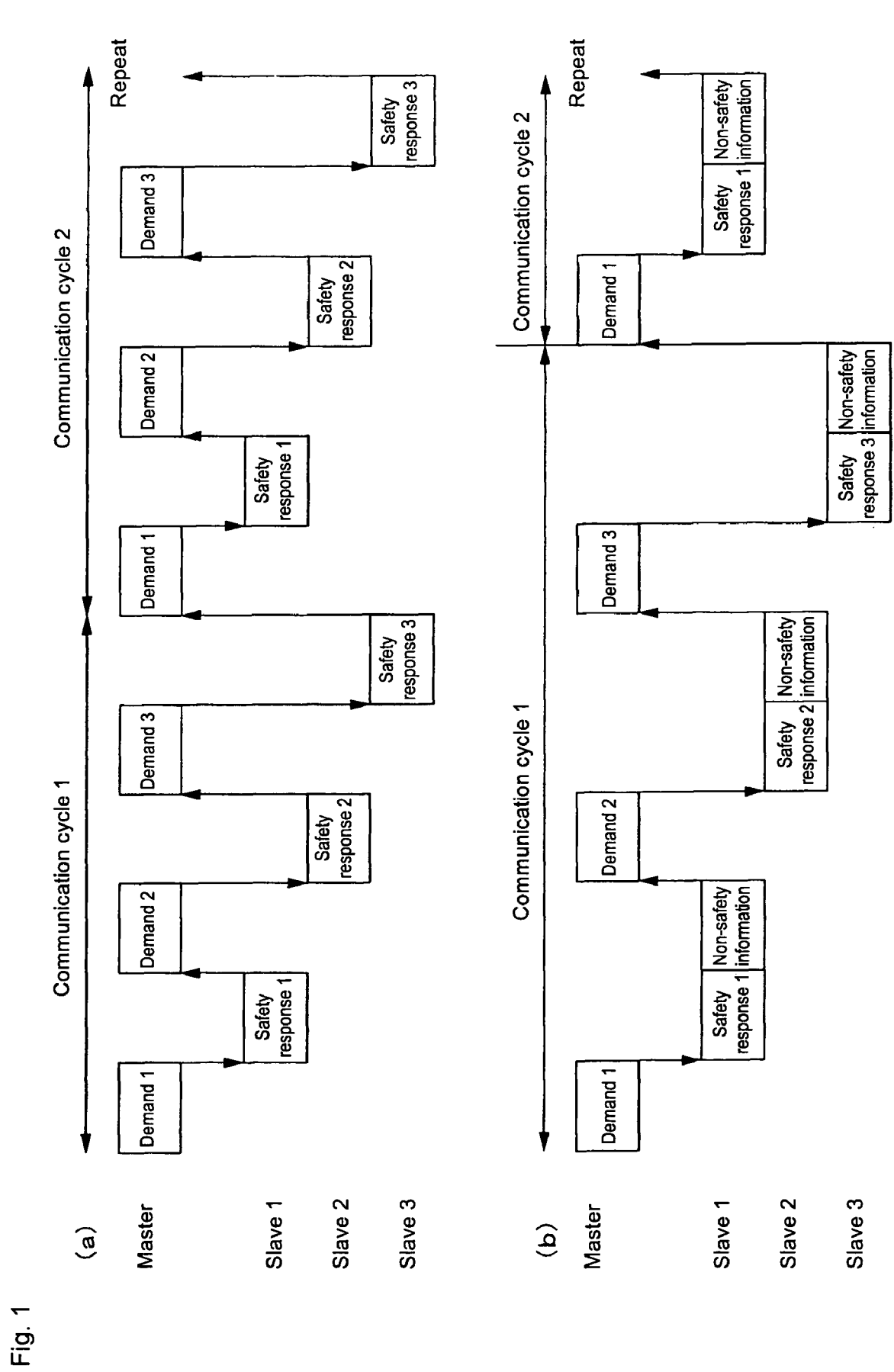
FIG. 1 shows a view for explaining conventional problems.
Figure 2:
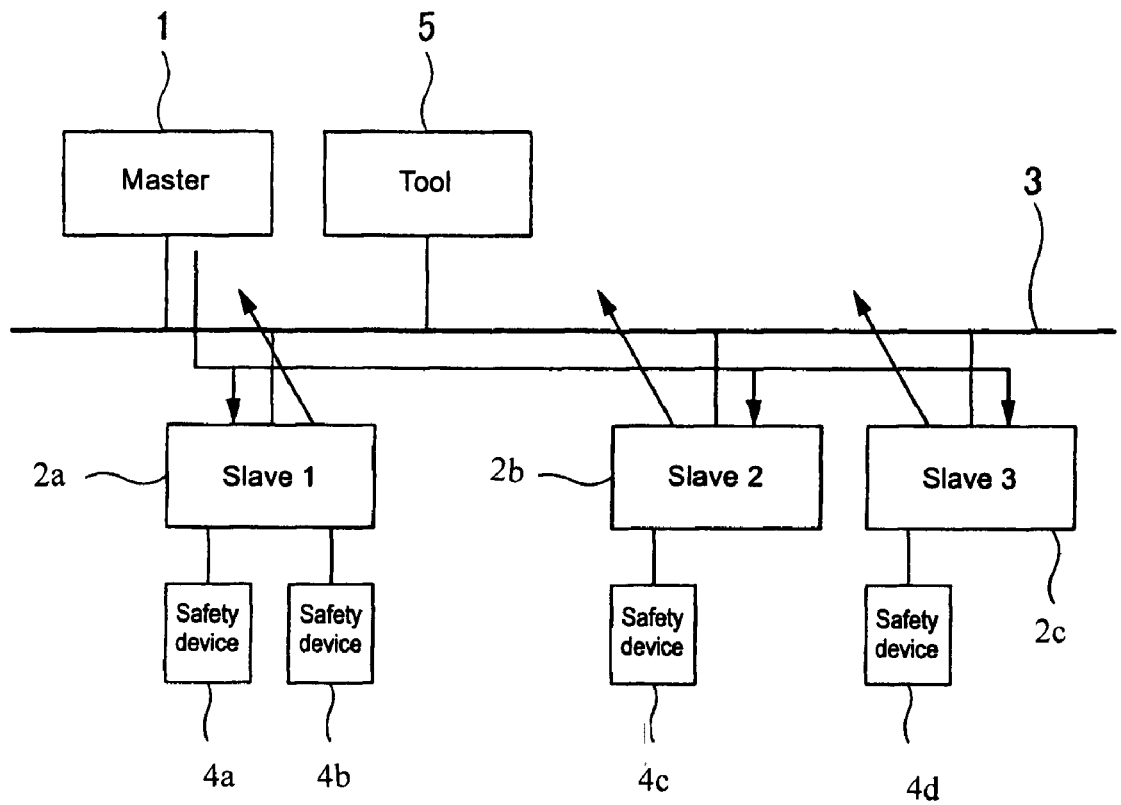
FIG. 2 shows a view of a safety network system according to an embodiment of the present invention.

FIG. shows an example of a safety network system to which the present invention is applied. As shown in FIG. 2, (individually 2a, 2b, 2c, etc.) a safety PLC 1 (master) and a plurality of safety slaves 2 are connected through a safety network 3. Information is received and transmitted between the safety PLC 1 and the safety slaves 2 by a master/slave system. Furthermore, various kinds of safety devices 4 (individually 4a, 4b, 4c, 4d, etc.) such as a safety door switch, a safety limit switch, an emergency stop switch, an input device, an output device and the like are connected to each safety slave 2. In addition, the safety PLC 1 is constituted so as to connect a plurality of units such as a CPU unit, a master unit (communication unit) and an I/O unit. In this case, the master unit is connected to the safety network 3.

Furthermore, a monitoring tool (a personal computer, for example) 5 can be connected to the CPU unit or the master unit of the safety PLC 1. This monitoring tool 5 collects and manages the information about the safety slave 2 and consequently the safety device 4 connected thereto through the safety PLC 1 as described later.

Each device constituting this safety network system incorporates a safety function (fail-safe). This safety function is a function of confirming and outputting (controlling) the safety. When a danger state occurs, the fail-safe works so that the system stops an operation on the safe side. More specifically, when the network system becomes in the danger state such as a case where the emergency stop switch is pressed down or a sensor such as a light curtain detects intrusion of a human (a part of a human body), the fail-safe works so that the system stops the operation on the safe side. In other words, the system generates an output to get a machine to work only when the safety is confirmed by the safety function. Therefore, when the safety is not confirmed, the machine is stopped.

Next, a description is made of reception and transmission of the information which is a substantial part of the present invention among such safety function. First, a communication function is incorporated in the safety PLC 1 and the information is received and transmitted between the PLC 1 and the safety slave 2 by the master/slave system. Similar to the prior art basically, the safety PLC 1 sequentially outputs a demand to each safety slave 2 through the safety network 3 and when the safety slave 2 receives the demand, it returns safety information as a safety response.

Figure 3:
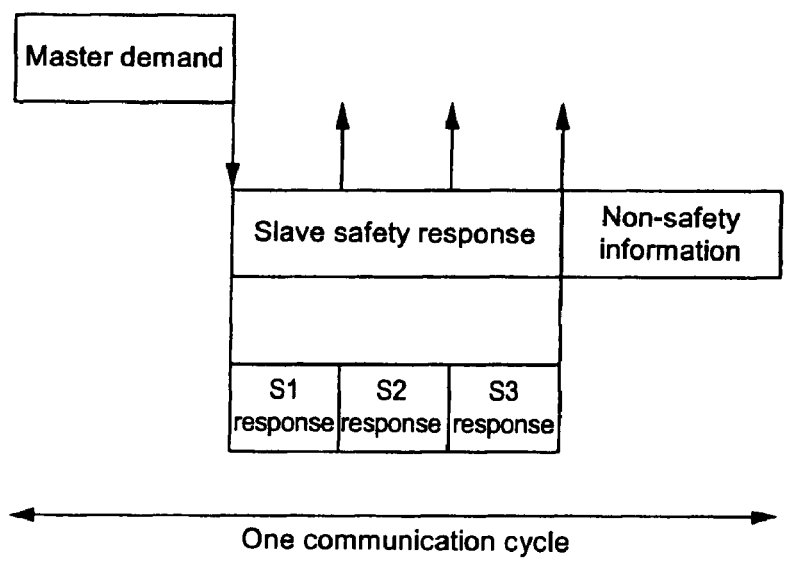
FIG. 3 shows a timing chart of procedures of communication between a safety PLC and a safety slave.

According to the present invention, as shown in FIG. 3, the safety PLC 1 outputs demands globally to safety slaves 2. Then, when the safety PLC 1 receives the safety responses for the demands from all of the safety slaves 2, it does not proceed to the next communication cycle immediately but it becomes a suspended state for a given period of time. A sufficient time is taken for this given period of time in order to receive a transmission frame from at least one of safety slaves 2.

That is, this given period of time is set for a period for transmitting and receiving no-safety information. Then, as described later, determination whether the non-safety information is transmitted or received is made on the side of the safety slave 2, and when the safety slave 2 determines that the non-safety information is transmitted, it transmits the non-safety information to the safety PLC 1 at the time of the suspended state for the given period of time.

Figure 4:
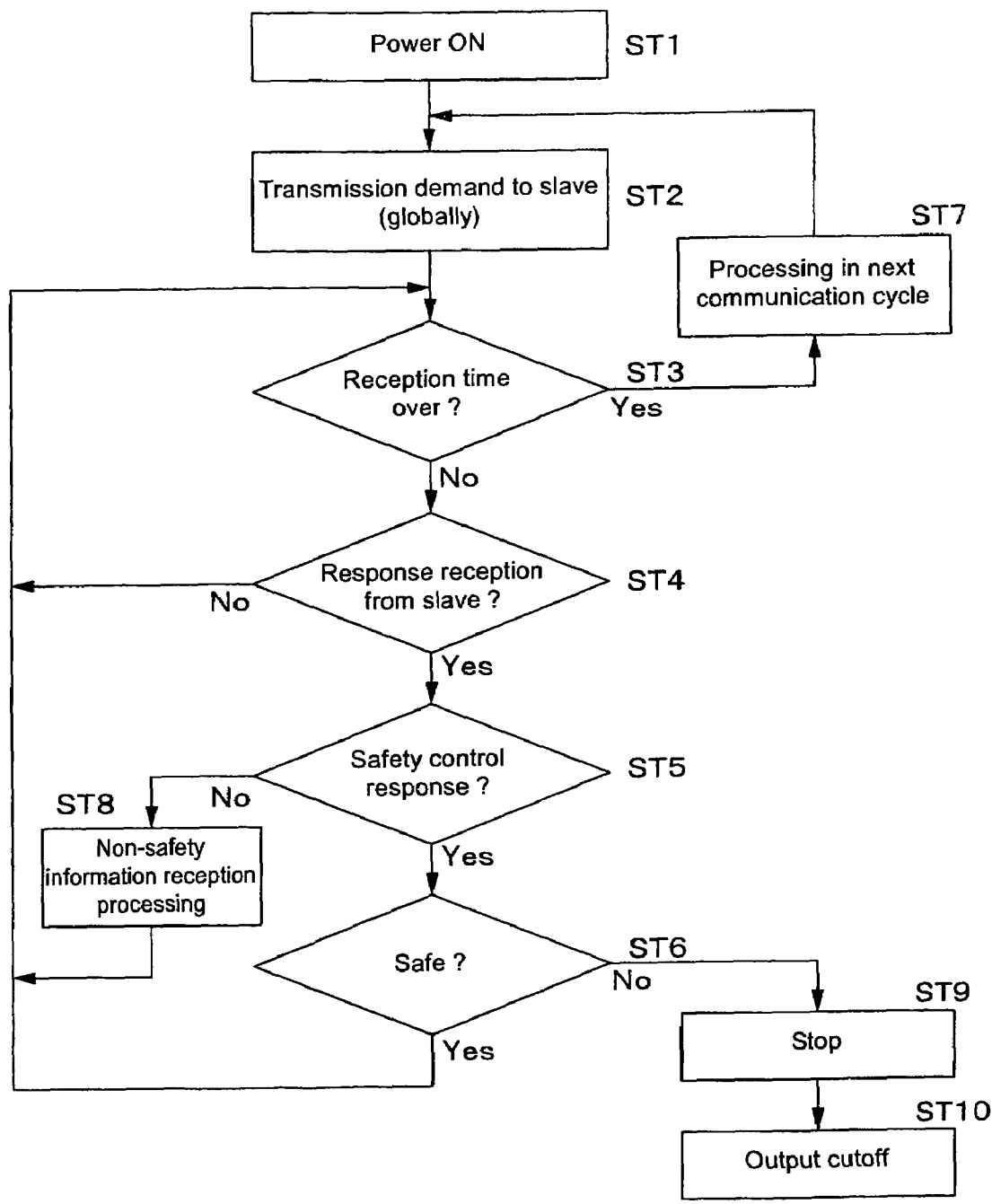
FIG. 4 shows a flowchart for explaining a function of a safety PLC (master).

More specifically, although the non-safety information is not necessarily transmitted frequently, there is a timing it has to be surely transmitted in a certain condition. However, according to the conventional system in which the non-safety information is returned as a response for the demands from the safety PLC 1 (master), since the safety PLC 1 does not know the state of the safety slave 2, it is not always true that the safety PLC 1 outputs the demand at the timing the non-safety information has to be transmitted. Therefore, it is necessary to output demands to all safety slaves at relatively frequent intervals in order to obtain the non-safety information at the right timing. Meanwhile, according to the present invention, since it can be easily known whether the non-safety information is to be transmitted or not on the side of the safety slave 2, the non-safety information is surely transmitted when needed and it is not transmitted when not needed. A concrete processing function in the MPU of the safety PLC 1 for carrying out the above processing is shown in a flowchart shown in FIG. 4.

That is, when a power supply is turned on, the safety PLC 1 outputs demands globally to all of the safety slaves 2 at predetermined timing (ST1 and ST2). Then, it waits for a response from the safety slave 2 until a reception time is over (ST3 and ST4). Here, the reception time is over when a time set as one communication cycle time passed after the transmission demands are output. More specifically, the reception time is provided by adding the time for being capable of receiving the non-safety information from at least one safety slave 2 to the time for receiving the safety information from all of the safety slaves 2.

Then, when there is a response from the safety slave (that is "YES" at step 4), it is determined whether the response is the safety response or not at step 5. Then, when it is the safety response, it is determined whether the content of the safety response (received safety information) is safe or not (ST6). When the result is abnormal (danger), the fail-save works to stop the communication processing at step 9 and then output cutoff processing is performed (ST7 and ST8). Meanwhile, when the received content is safe, the operation returns to step 3 and waits for the next reception.

Meanwhile, when "NO" is determined at step 5, that is, the non-safety information is received, predetermined reception processing for the non-safety information is performed at step 8. Namely, the received non-safety information is stored in a memory or displayed at a monitor. Then, the operation returns to step 3 to wait for the next reception. Then, when the reception time is over ("YES" at step 3), since processing for this communication cycle is completed, the processing is performed in the next communication cycle (ST7) Thus, the above processing is repeated.

In addition, although it is not shown in the flowchart, when the reception time is over, it is determined whether the responses are received from all of the safety slaves 2 connected to the safety network 3 or not in practice. Of course, in order to make the above determination, processing for storing the number or the like of the safety slaves from which the safety response is received is performed. Then, when there is a safety slave from which the safety response is not received, since it is estimated that there is a trouble on the network, the communication stop processing is performed at step 9. Meanwhile, even when there is a safety slave from which the safety response is not received, the operation is not immediately stopped but the communication may be stopped after the communication cannot be performed N times in succession. This processing has been performed conventionally.

Figure 5:
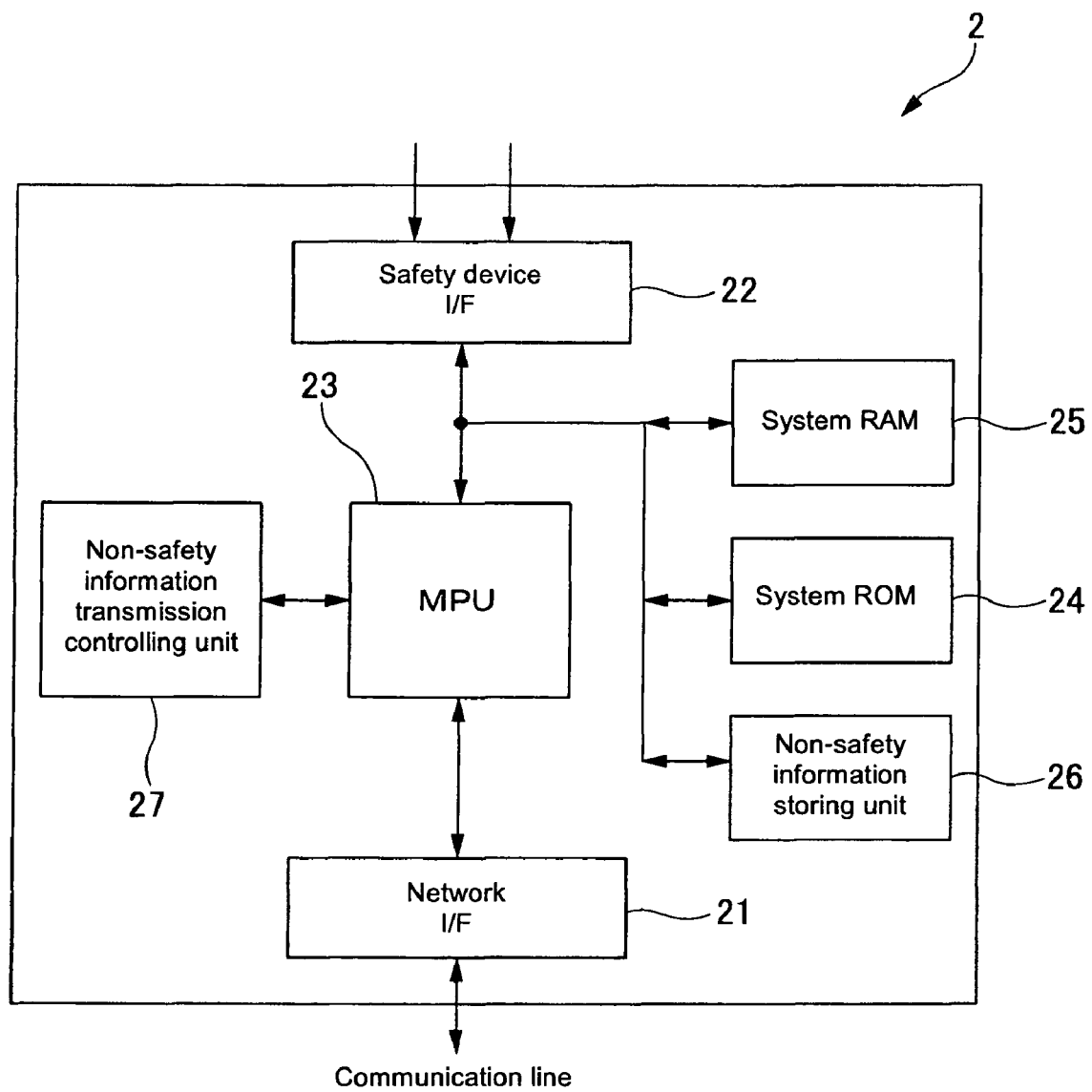
FIG. 5 shows a view of the safety slave according to a preferred embodiment of the present invention.

Meanwhile, the safety slave 2 has a function of returning the safety response according to the demand from the safety PLC 1, a function of collecting and storing the non-safety information and a function of transmitting the stored non-safety information to the safety PLC 1 at a predetermined timing. A concrete internal structure for implementing the functions is as shown in FIG. 5. Referring to FIG. 5, there are provided a network interface 21 connected to the safety network 3, for transmitting and receiving data with the safety PLC 1, a safety device interface 22 for transmitting and receiving data with the safety device (not shown) connected to the safety slave 2, and an MPU 23 for performing predetermined processing by reading a program stored in a system ROM 24 and appropriately using a memory region of a system RAM 25. The MPU 23 performs processing for returning the safety information (safety/danger) obtained from the safety device through the safety device interface 22 to the safety PLC 1 through the network interface 21 and the safety network 3, corresponding to the demand received from the master through the network interface 21.

In addition, the safety slave 2 itself can be the safety device, and in this case, there is no safety device interface 22, which becomes a safety device portion for detecting existence of the safety. Here, since the constitution and the operation principle of the safety slave 2 is the same as the prior art, detailed description thereof is omitted.

Furthermore, the MPU 23 has a function for observing operation states (an energized time, the number of ON/OFF operations and the like) of the safety device 4, and also performs processing for storing the device information such as the operation states obtained by the observing function in a non-safety information storing unit 26. Then, the non-safety information (device information) stored in the non-safety information storing unit 26 is transmitted to the safety PLC 1 according to a rule to be described later.

A data structure of the non-safety information storing unit 26 is shown in FIG. 6, for example. Here, inputs 1, 2, 3, . . . are the numbers of the contact points (terminal blocks) of the safety slave 2. Each item shown in FIG. 6 such as a kind of the device, a name of a manufacturer, a type, life setting, or the like is previously registered. Mores specifically, when necessary information is transmitted to the safety slave 2 through the safety network 3, using a tool connected to the safety PLC 1 or the safety network 3, and information is transmitted from a tool directly connected to the safety slave 2, the MPU 23 of the safety slave 2 acquires that information through the network interface 21, relates it to the contact point number and registers it in the non-safety information storing unit 26. Here, life setting is a value found from, for example, energized time and the number of operations which show its life span, using a predetermined arithmetic expression. When the life span is finished, since the safety device 4 is to be exchanged, a result of the life span becomes abnormal and the safety information (abnormal) is output.

In addition, a state, the number of operations, the energized time, a notification flag and the like are collected by the MPU 23 during activation of the system and recorded. Here, the state is information for determining whether the safety device 4 is ON or OFF, the number of operations is information showing the number of ON/OFF operations at the contact point of the safety device 4 and the energized time is cumulative hours the safety device 4 is energized. In addition, the result of life span shows whether the life span has finished or not (normal). Still further, a display may be provided in the safety slave 2 so that the information of the device stored in the non-safety information storing unit 26 can be displayed.

Figure 7:
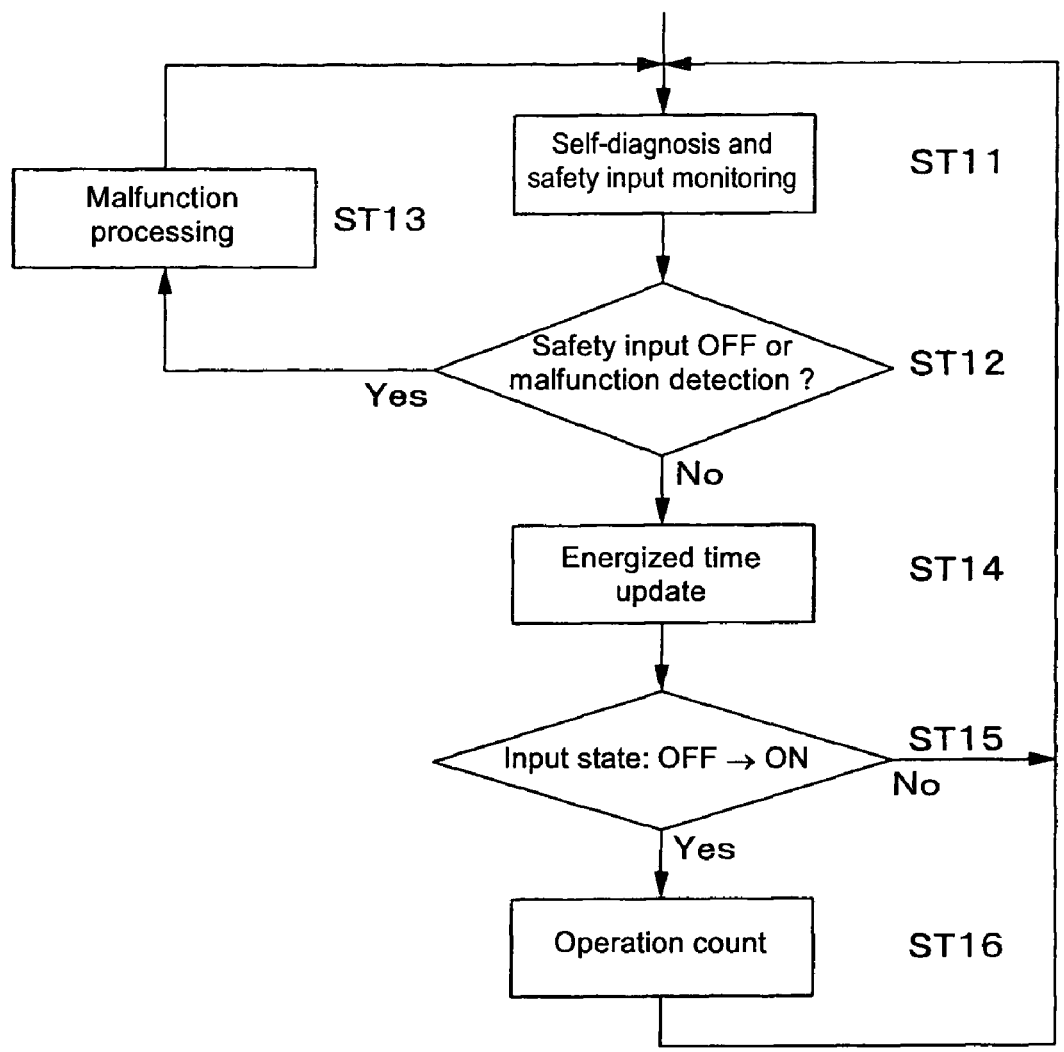
FIG. 7 shows a flowchart of functions (collection and storing of the non-safety information) of an MPU of the safety slave.

Collection algorithm such as the above described energized time, the number of ON/OFF operations at a relay and the like are shown in a flowchart shown in FIG. 7. More specifically, the MPU 23 performs self-diagnosis and safety input observation (ST11). That is, it is detected whether the malfunction is generated in the connected safety device 4 or not by the self-diagnosis and this operation itself is well known. In addition, the input from the connected safety device 4 is observed by the safety input observation. When there is a malfunction or input, the safety device having that information is specified.

Then, it is determined whether the result of the self-diagnosis and the safety input observation at step 11 is malfunction detection or OFF of the safety input (not safety and danger) (ST12). Then, when the malfunction or the like is detected, the malfunction processing is performed (ST13). In other words, the abnormal state or the like is stored in a section for the self-diagnosis result or the ON/OFF information at the corresponding contact point number in the safety information storing unit (not shown). In addition, the diagnosis result or the like is transmitted as the safety response, corresponding to the demand of the safety information from the safety PLC 1.

Meanwhile, when "NO" at step 12, that is, it is determined that the safety state is detected and the energized time is updated (ST14). According to this update processing, a time from the previous update processing to the present time is measured by a timer (the measurement is not performed while the safety device 4 is stopped (no energization)), and a value provided by adding the energized time from the previous update processing to the present time, to the energized time at the time of the previous update processing is stored in the non-safety information storing unit 26 as the newly updated energized time.

Then, it is determined whether the input state of the safety device 4 has been changed from OFF (previous time) to ON (present time) or not (ST15). More specifically, in a case of OFF at the previous time, the section in the non-safety information storing unit 26 for the ON/OFF information is OFF through the processing at step T13. Therefore, when the ON/OFF information at the corresponding contact point number is OFF, "YES" is determined at step 15. Then, an operation count is incremented by one (ST16). The operation count is registered in a section for the number of operations in the non-safety information storing unit 26 and the section in the non-safety information storing unit 26 becomes ON. Thus, when the operation count is incremented by one, since the state becomes ON, determination at step 15 in the next cycle (in a case where the safety input does not become OFF in mid-flow) is "NO" and the operation count is not incremented. In addition, since ON state has been already registered, it does not matter if the ON state is not written in again. Hereinafter, the state of the safety device 4 can be collected and stored by performing the above processing repeatedly.

In addition, the measurement and counting of the energized time and the number of the operations may be performed with a timer and a counter on the side of the safety slave 2, respectively or the energized time and the number of the operations may be measured and counted on the side of the safety device 4 connected to the safety slave 2, respectively and constantly stored on the side of the safety device 4 so that the safety slave 2 may read the stored information stored in the safety device 4 at the predetermined timing.

In addition, according to this embodiment, a non-safety information transmission controlling unit 27 for determining the timing for transmitting the non-safety information stored in the non-safety information storing unit 26 is provided. According to this embodiment, the non-safety information transmission controlling unit 27 is a memory for storing a threshold value of the transmission timing for notifying the non-safety information.

More specifically, according to a data structure of the non-safety information transmission controlling unit 27, as shown in FIG. 8, one or more timings for transmission are stored regarding the energized time, the number of ON/OFF operations at the relay and the number of retrying operations of the communications. According to the energized time, when the energized time exceeds 200 h, 400 h, 600 h and 800 h, the present value is notified to the safety PLC (master) 1. In addition, according to the number of the ON/OFF at the relay, when the number exceeds 3000, 5000, 8000 and 10000, the present value is notified to the safety PLC 1. Furthermore, according to the number of retries, when the communication cycles become 500, 1000, 1500 and 2000, the number of retrying operations is notified to the safety PLC 1.

In short, regarding the life span, a fact that a certain period has passed in the life span maybe informed. For example, in the case of the number of the ON/OFF at the relay, delimiting values such as 5000, 8000 and the like may be set as shown in the drawing, or a ratio may be set. For example, when the life span setting is at 80000 (times or hours) like a door switch of the input 1 shown in FIG. 6, it may be 26667 times which is one third thereof or 64000 times which is 80% thereof. In other words, it is all right if the information showing that the device is whereabouts in the course of the life span (in the course of consumption) within a range in which the safety operation is secured can be obtained.

Thus, when the network information (the number of retrying operations at the time of communication errors, an input/output response time and the like) is informed, an improvement point of the network environment is clarified and the response time (a safety stop time in a safety corresponding system) can be optimized. In other words, when there is any safety device in which the malfunction or the trouble is frequently generated, since it can be estimated that there are some problems, the system can be changed by changing the device itself, for example.

In addition, the above energized time and the number of ON/OFF at the relay can be obtained by accessing the non-safety information storing unit 26. Furthermore, since the information about the communication cycles and the number of retrying operations is stored and held in a chip itself which controls and performs the communication, it can be determined whether the transmission timing has come or not by collecting the relevant information. More specifically, according to this embodiment, actual determination whether the transmission timing for the non-safety information has come or not is made such that the MPU 23 accesses the non-safety information transmission controlling unit 27 to acquire the transmission timing for each non-safety information and accesses the non-safety information storing unit 26 to determine whether there is any one reaching the transmission timing or not. Then, when the non-safety information reached the transmission timing is detected, the relevant information is transmitted.

Still further, it is needless to say that the non-safety information to be transmitted is not limited to the above information. For example, a self-diagnosis result may be transmitted as the non-safety information. In other words, when the malfunction is detected by the self-diagnosis, information showing the cause of the malfunction can be transmitted. As one example of information of malfunction cause by the self-diagnosis of a device incorporating a light curtain function, there are interlock wiring malfunction, external relay monitor malfunction, interference light malfunction, control output malfunction and sensor destruction.

Figure 9:
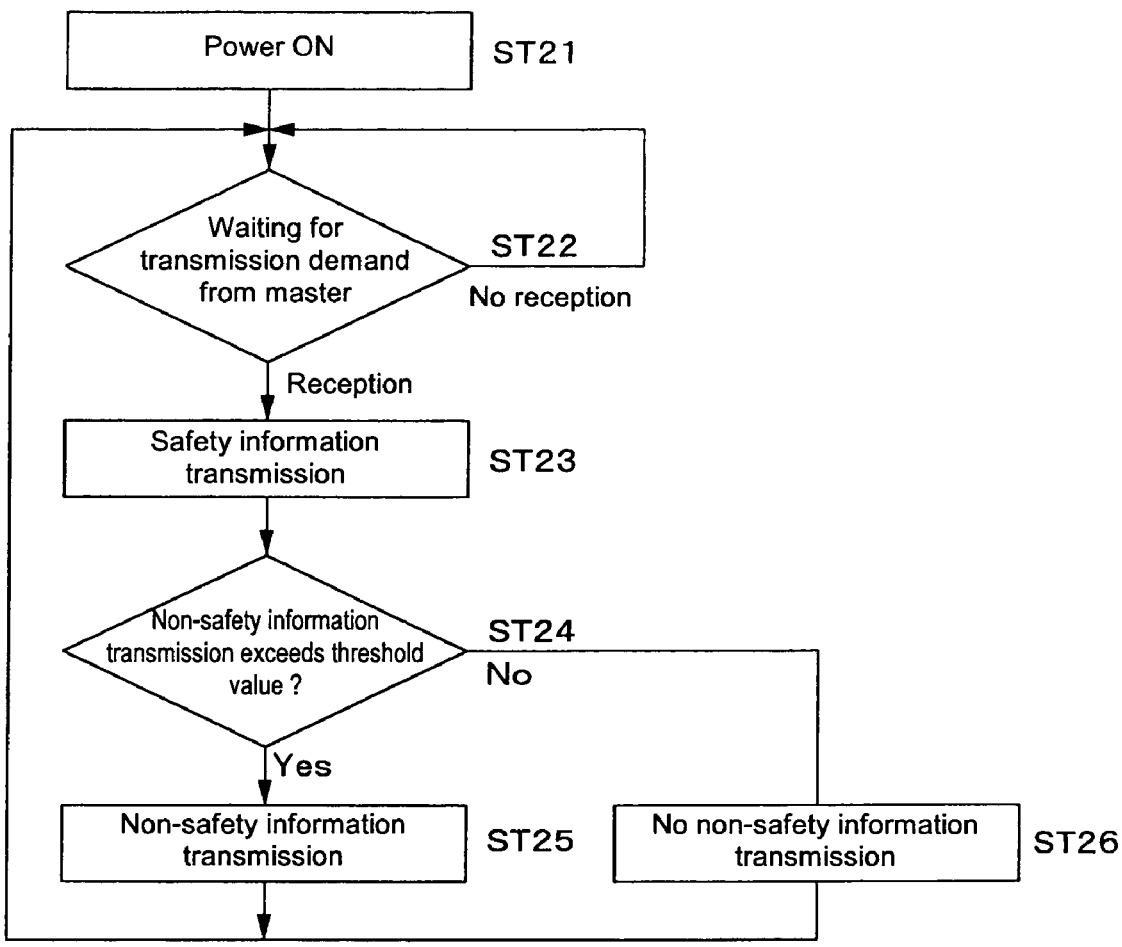
FIG. 9 shows a flowchart of a function (transmission control) of the MPU of the safety slave.

Then, control algorithm of transmission of the safety information and the non-safety information in the MPU 23 is shown by a flowchart in FIG. 9. That is, when the power supply is turned on, the operation waits for a demand transmitted from the safety PLC (master) (ST21 and ST22). When the demand is received, a safety response is made (ST23), that is, a safety state (safety/abnormal) is notified.

Then, it is determined whether the transmission timing for the non-safety information has come or not (ST24). More specifically, it is determined whether the predetermined information or the number of communications stored in the non-safety information storing unit 26 reaches a set value stored in the non-safety information transmission controlling unit 27, or whether the result of the self-diagnosis to be notified exists or not. When it is determined that the non-safety information transmission timing has come, the relevant non-safety information is transmitted (ST25). Alternatively, when the transmission timing has not come yet, it is determined that the non-safety information is not transmitted in this communication cycle (ST26) Hereinafter, by repeating the above processing, the safety response is made according to the demand from the safety PLC (master) 1, and when the transmission timing for the non-safety information comes, the non-safety information is positively transmitted on the side of the safety slave 2 as the main body. In addition, the transmission of the non-safety information is performed after the above demand is received and it is confirmed that a transmission frame is not transmitted by monitoring the data on the safety network 3.

Meanwhile, the transmission, reception and communication protocol of the data on the safety network 3 by the network interface 21 in this embodiment employs CAN (Controller Area Network). That is, as well known, according to the CAN, a priority is managed on a data link layer and the data on the communication line is wired ORed and when data "1" coincides with data "0", the data "1" appears on the line. At this time, each safety slave 2 sends the transmission frame (safety information) to be transmitted from itself, monitors the data on the line, determines whether the data flowing on the line coincides with the data transmitted from itself and when they do not coincides with each other, it is determined that there is no authority to perform the transmission this time and transmission of the data hereinafter is stopped.

Thus, since the transmission frame is normally arranged in order of header information, destination and source addresses, and data to be transmitted, the transmission is performed in ascending order of the node number of each safety slave 2, that is, from the source address. Thus, as shown in FIG. 3, the safety slave 2 returns the safety response in the order of ①→②→③, for the global demand from the safety PLC 1.

Figure 10:
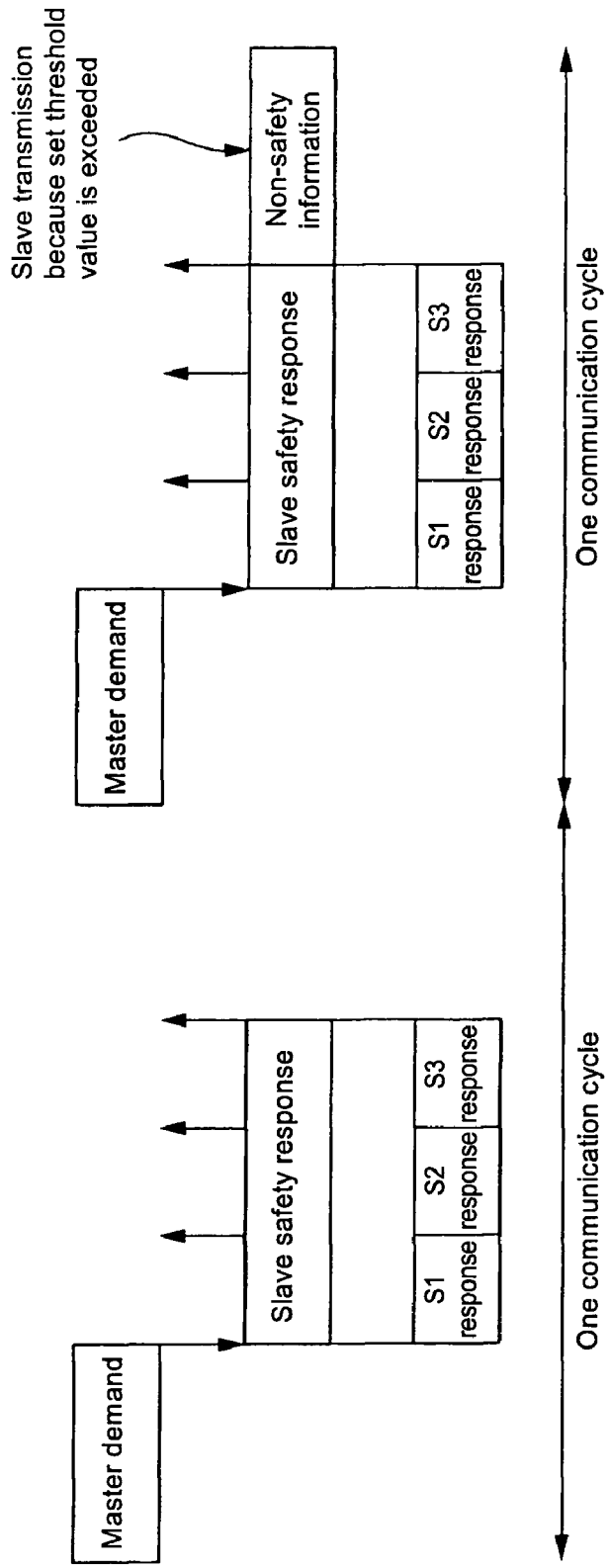
FIG. 10 shows a view for explaining operations for transmitting the safety information and the non-safety information.

According to the above embodiment, as shown in FIG. 10, when the transmission timing for the non-safety information does not come yet, after each safety slave 2 returns the safety response, each safety slave 2 waits for the next demand. In addition, according to the drawing, the safety slave ① is designated by S1, the safety slave ② is designated by S2 and the safety slave ③ is designated by S3. That is, the safety response is only performed and the processing is completed in the Nth communication cycle.

Then, when a time set to one communication cycle passed and the reception time is over, since the safety PLC (master) 1 outputs the next demands, the safety slaves receive them and sequentially return the safety response. Then, in this (N+1)th communication cycle, since a certain safety slave 2 reaches the transmission timing for the non-safety information (the predetermined non-safety information exceeds a set threshold value), after the safety response is transmitted, the non-safety information is transmitted. This non-safety information is only the non-safety information which exceeded the set value. Thus, an amount of data to be transmitted is reduced, so that it can be transmitted for a short time. Of course, information other than the non-safety information which exceeded the threshold value may be transmitted together.

Figure 11:
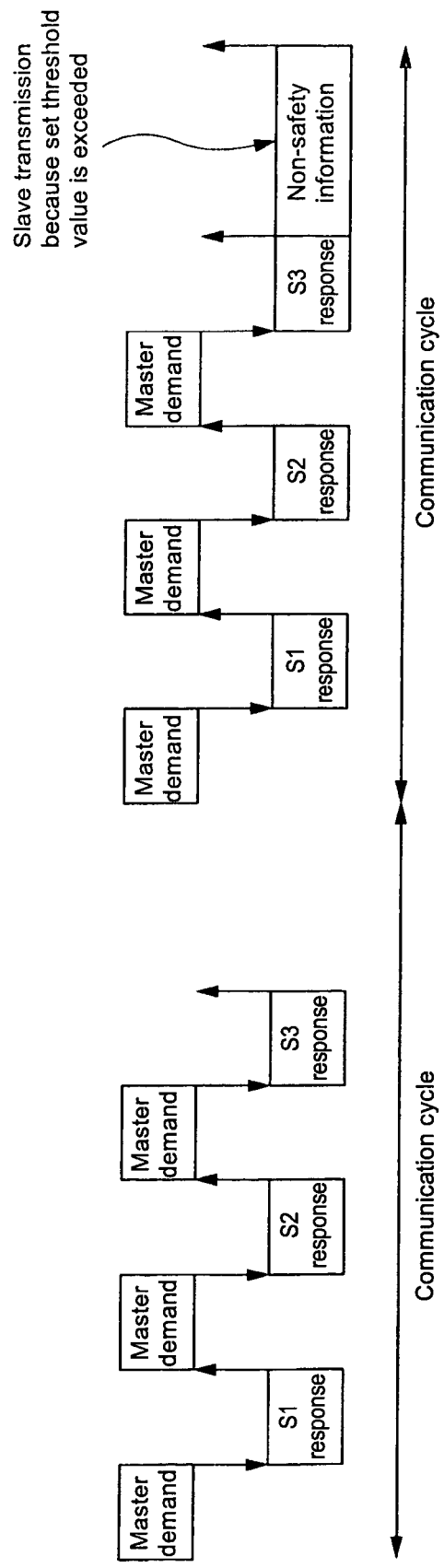
FIG. 11 shows a view for explaining operations for transmitting the safety information and the non-safety information.

In addition, although the safety PLC 1 globally outputs demands to safety slaves in the above embodiment, the present invention is not limited to this. For example, as shown in FIG. 11, the present invention can be applied to a case where the safety PLC 1 outputs a demand to each safety slave 2 in order of ①→②→③ and the safety slave 2 receives the demand and sequentially returns the safety response. In this case also, as shown in the drawing, the non-safety information is transmitted when there is any non-safety slave which exceeds the set threshold value and reaches the transmission timing for the non-safety information, but the non-safety information is not transmitted when the transmission timing is not reached.

Furthermore, although the non-safety information transmission controlling unit 27 and the non-safety information storing unit 26 are separately described in the above embodiment, it is needless to say that they may be stored as one table. In addition, although the non-safety information transmission controlling unit 27 is the memory for storing the threshold value which is a reference for determining whether the transmission timing is reached or not, and the MPU 23 actually makes the determination in the above embodiment, it is all right, of course if the non-safety information transmission controlling unit 27 monitors the non-safety information storing unit 26 and triggers the MPU 23 when the transmission timing came.

Still further, although there is provided a period for transmitting the non-safety information after a period for transmitting the safety response of the safety information, in one communication cycle in the above embodiment, the present invention is not limited to this, and the period for transmitting the non-safety information may not be provided especially. In other words, as one example, when the transmission timing for the non-safety information came, the non-safety information is transmitted instead of the safety information.

In other words, when the safety demand is output from the safety PLC, the safety response is transmitted normally, but when the transmission timing for the non-safety information came, the non-safety information is transmitted. At this time, the non-safety information is transmitted under the condition that the safety slave is in a safety state. Thus, a fact that the non-safety information is transmitted means that security of the safety slave is assured. Therefore, when the safety slave is in the safety state, the safety PLC can confirm that the safety slave is in the safety state directly by receiving the safety information (safety), or indirectly by receiving the non-safety information. Additionally, if it is not in the safety state when the timing for transmitting the non-safety state has come, since the safety information (danger and abnormal) showing that it is not safe is transmitted, a response time taken before the fail-safe starts to work when it became non-safety state is not elongated. In other words, the non-safety information can be transmitted from the slave (safety slave) to the master (safety controller) without influencing a traffic of the safety network.

In addition, in this case, since it cannot be determined whether the received frame is the safety information or the non-safety information on the side of the safety PLC, a flap for distinguishing them may be added to the transmission frame, for example.

Meanwhile, the slave described in the above embodiment shows the example in which the system is controlled by transmission and reception of I/O information with the master unit, and by transmission and reception of the I/O information with a controller (PLC) through the master unit, and the description was made of the master/slave system in which the desired slave returns the response to the master unit when receives the demand from the master between the master unit and the slave. However, the slave according to the present invention is not limited to one which performs communication between the master and the slave. That is, although it is called the slave, any communication system can be used. In this respect, strictly speaking, it includes a concept which is different from a slave defined in general.

In other words, according to the slave of present invention, any communication protocol can be employed as long as there is a function of transmitting and receiving the I/O information needed for controlling between the slave and the controller. In addition, the destination of the safety information and the non-safety information to be transmitted in the present invention is not limited to the master unit or the controller, it can be a device such as a monitor, a configuration tool, another slave or another unit which is connected to the network other than the self-node, that is, another node.

Thus, the communication system can be appropriately selected depending on the transmission destination. In the case of the trigger also, it is not always performed depending on an external demand (a demand from the monitor and configuration tool, for example) such as the above request from the master, and transmission may be performed based on an internal trigger (an internal timer and an event generated in a fixed condition, for example).

Here, the "internal trigger" is based on the result of the predetermined processing of the slave itself and generated in the slave. One example of the internal trigger is as follows. That is, when the abnormal state is generated, or it is determined whether the state information of the input/output unit acquired by the slave reaches the threshold value or exceeds the threshold value or not, its determined result is generated. The determined result is used as a trigger signal in some cases. As another case, a clock is provided in the slave and the trigger signal is generated periodically each time a predetermined period measured by the clock passes, or the trigger signal is generated at a predetermined time.

The internal trigger is further described in detail. There are an internal trigger which determines the timing the safety slave transmits the information, and an internal trigger which is generated when the condition for transmitting the non-safety information is satisfied at the time of the transmission of the information. The former internal trigger which determines the timing for transmitting the information is generated when the predetermined period measured by the internal timer passed or when a condition event was generated. The latter internal trigger as a notification condition of the non-safety information is generated when the value collected as the non-safety information exceeds the threshold value or when the result of the self-diagnosis is to be notified. Of course, as the notification condition of the non-safety information, an internal timer may be provided so as to generate a trigger which notifies the non-safety information when a predetermined period longer than a normal transmission interval passed.

In addition, when the safety slave transmits the information based on the self-internal timer if another safety slave is transmitting the information, it stops the transmission, and when the transmissions are performed at the same time and crushed on the network, the safety slave having a high priority (whose node number is small) continues the transmission. Thus, the information can be sequentially transmitted from the safety slaves in a predetermined order in one communication cycle. Thus, the information can be repeatedly and smoothly transmitted in that order hereinafter by appropriately setting a transmission timer.

Figure 12:
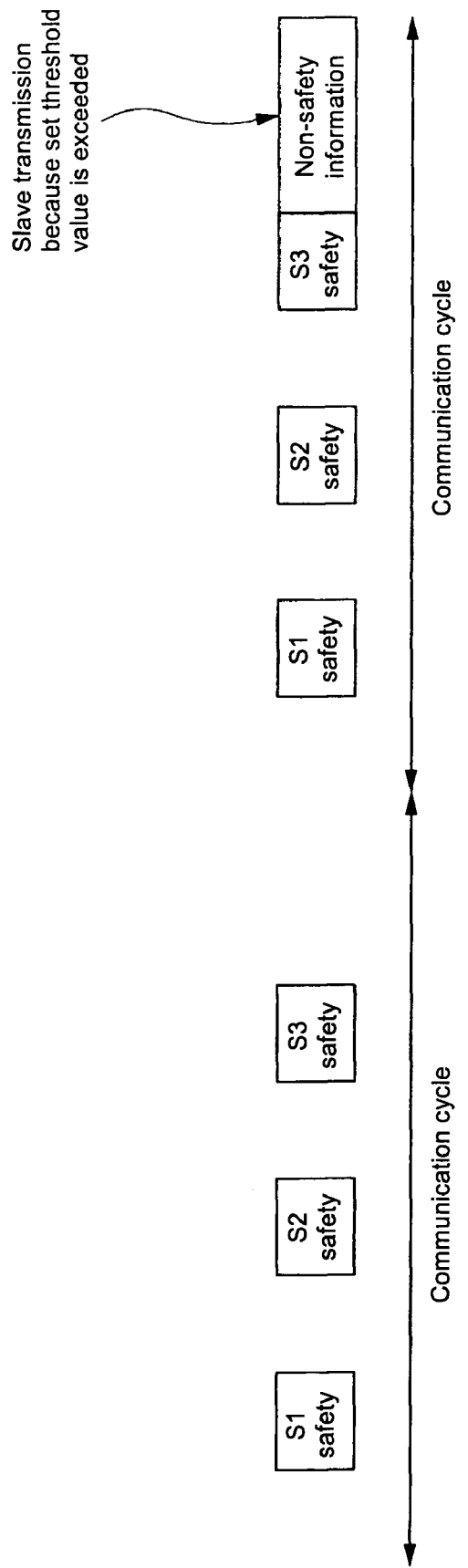
FIG. 12 shows a view for explaining operations for transmitting the safety information and the non-safety information.

When the information is voluntarily generated from the side of the slave based on the internal trigger, the safety slave transmits the safety information at the appropriate timing which is not the response for the demand from the master, as shown in FIG. 12, for example, so that the non-safety information can be transmitted as needed. The transmission destination in this case may be the master like in the above embodiment or may be another device such as the configuration tool.

Figure 13:
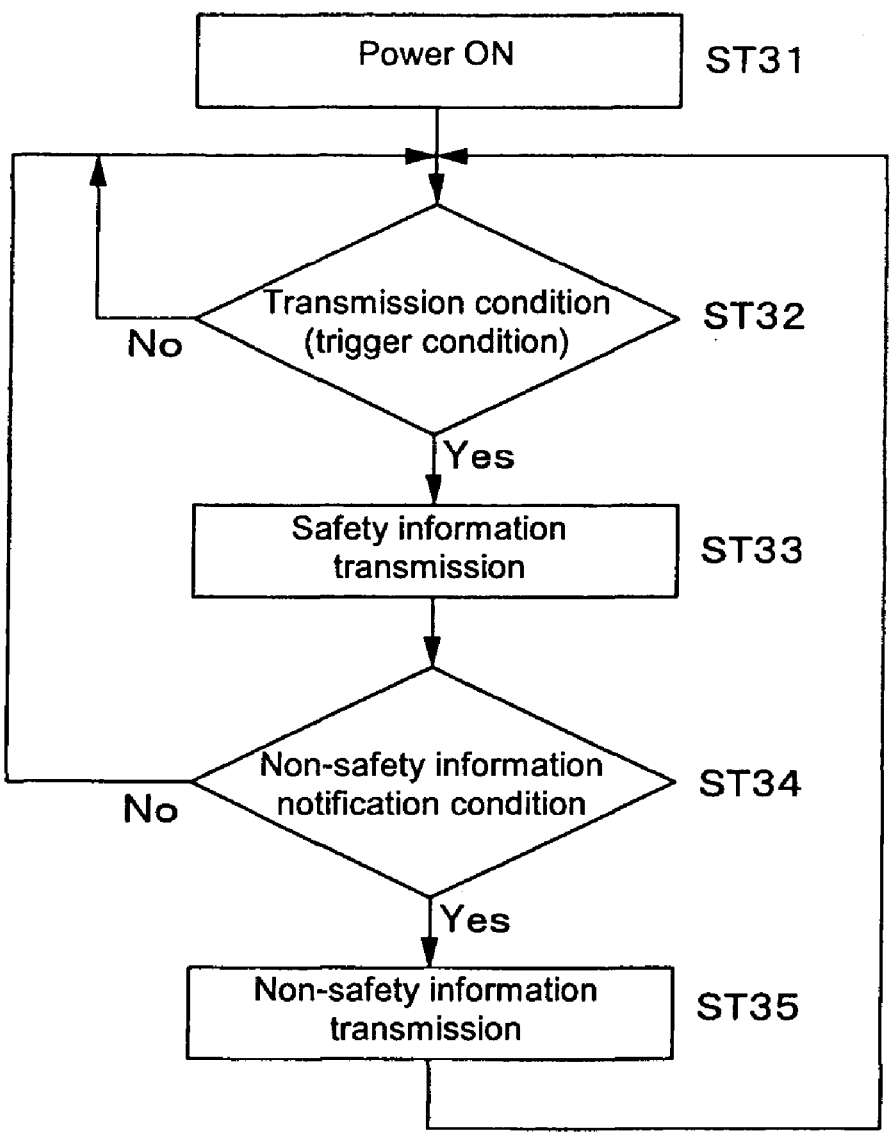
FIG. 13 shows a flowchart of a function (transmission control) of the MPU of the safety slave for performing the operations shown in FIG. 12.

As the function of the safety slave for performing the above processing, a flowchart shown in FIG. 13 may be implemented. That is, when a power supply is turned on and the safety slave waits until the transmission condition is provided, that is, until the internal trigger for information transmission is generated (ST31 and ST32). When the internal trigger for the information transmission is generated, the present safety state (safety/abnormal) is transmitted to the predetermined destination as the safety information (ST33).

Then, it is determined whether the transmission timing for the non-safety information is reached or not (ST34). That is, it is determined whether the predetermined information or the number of communications stored in the non-safety information storing unit 26 reaches the set value stored in the non-safety information transmission controlling unit 27 or not, or whether there is a self-diagnosis result to be transmitted or not. Then, when the condition is provided, the relevant non-safety information is transmitted (ST35). Alternatively, when the condition is not provided, the non-safety information is not transmitted in this communication cycle and the operation returns to step 31 and the slave waits until the next internal trigger is generated. Hereinafter, the above processing are repeatedly performed, so that the safety slave voluntarily generates the safety information at the appropriate timing and when the transmission timing for the non-safety information is reached, the non-safety information is positively transmitted on the side of the safety slave as a main body.

In addition, the transmission of the non-safety information is performed after the safety information is transmitted, data flowing on the safety network 3 is monitored and a fact that the transmission frame is not transmitted is confirmed.

In this case also, when the transmission condition of the non-safety information is reached, the safety information is not transmitted but only the non-safety information may be transmitted under the condition that the safety slave is in the safety state. In other words, when the safety slave is in the safety state, the safety PLC or the like can confirm that the safety slave is in the safety state directly by receiving the safety information (safety), or indirectly by receiving the non-safety information. Additionally, if it is not in the safety state when the timing for transmitting the non-safety state has come, since the safety information (danger and abnormal) showing that it is not safe is transmitted, a response time taken before the fail-safe starts to work when it became in non-safety state is not elongated.

In addition, in this case, since it cannot be determined whether the received frame is the safety information or the non-safety information on the side of the safety PLC, a flap for distinguishing them may be added to the transmission frame, for example.

INDUSTRIAL APPLICABILITY

According to the present invention, since device information storing means is provided in a slave to store and hold information about a device connected to the slave, a controller or a tool can collect the stored information about each device connected to the slave. Thus, according to the present invention, since it is not necessary to always collect the information in a whole system, the amount of time for transmission and reception of non-safety information in a network traffic can be decreased. Furthermore, since a safety slave collecting the non-safety information transmits the non-safety information at a desired timing, a safety controller or another apparatus can effectively collect the non-safety information.

The invention claimed is:
1. A safety slave connectable to a safety network, the safety slave comprising:

a safety information transmitting function of transmitting safety information determining whether a safe state corresponding to safety of a human or a dangerous state corresponding to danger to a human exists, corresponding to a demand transmitted from a safety controller through the safety network;

non-safety information storing means for storing non-safety information about the safety slave;

storing means for storing a fixed condition for transmitting the non-safety information;

monitoring means for determining whether the non-safety information stored in the non-safety information storing means satisfies the condition or not;

determining means for determining a transmission timing based on a monitored result of the monitoring means, wherein said fixed condition is corresponding to a life expectancy of a safety device connected to said safety slave; and a function of transmitting at least the non-safety information at said transmission timing when said monitoring means determines the non-safety information satisfies said fixed condition wherein transmission of the non-safety information is performed in one communication cycle based on the demand after safety slaves other than the safety slave finishes safety response, the safety slaves other than the safety slave being connected to devices other than the devices connected to the safety slave.

2. A safety network system comprising a safety controller and a safety slave according to claim 1, which are connected through a safety network, wherein information of the device output from the slave is transmitted to the controller.

3. The safety network system according to claim 2, wherein one communication cycle managed by the safety controller has a reception period for non-safety information after reception of a safety response from the safety slave.

4. The safety slave according to claim 1, wherein said fixed condition is further corresponding to at least one of an energized time of a safety device connected to said safety slave, a number of ON/OFF operations of relays in said safety slave and a number of retrying communication.

* * * * *